US007665113B1

(12) United States Patent
Abrams

(10) Patent No.: US 7,665,113 B1
(45) Date of Patent: Feb. 16, 2010

(54) RATE ADAPTIVE VIDEO TRANSMISSION AND SYNCHRONIZATION SYSTEM

(75) Inventor: David Hardin Abrams, Winston-Salem, NC (US)

(73) Assignee: TrueSentry, Inc., Winston-Salem, NC (US)

( * ) Notice: Subject to any disclaimer, the term of this patent is extended or adjusted under 35 U.S.C. 154(b) by 440 days.

(21) Appl. No.: 11/753,240

(22) Filed: May 24, 2007

(51) Int. Cl.
*H04N 7/173* (2006.01)

(52) U.S. Cl. ............................. 725/94; 725/86; 725/91; 725/92; 725/93; 725/98; 725/114; 725/115; 725/116; 725/118

(58) Field of Classification Search .................. 725/86, 725/91–94, 98, 114–116, 118
See application file for complete search history.

(56) References Cited

U.S. PATENT DOCUMENTS

| 6,091,777 | A  | 7/2000  | Guetz   |
| 6,631,240 | B1 | 10/2003 | Salesin |
| 7,016,409 | B2 | 3/2006  | Unger   |

OTHER PUBLICATIONS

RFC 3550: RTP: A Transport Protocol for Real-Time Applications, (H. Schulzrinne), Jul. 2003, [online], [retrieved on May 23, 2007] Retrieved from the Network Working Group using Internet <URL: http://www.rfc-editor.org/rfc/rfc3550.txt>.
RFC 2435: RTP Payload Format for JPEG-compressed Video, (L. Berc), Oct. 1998, [online], [retrieved on May 23, 2007] Retrieved from the Network Working Group using Internet <URL: http://www.rfc-editor.org/rfc/rfc2435.txt>.
RFC 3984: RTP Payload Format for H.264 Video, (S. Wenger), Feb. 2005, [online], [retrieved on May 23, 2007] Retrieved from the Network Working Group using Internet <URL: http://www.rfc-editor.org/rfc/rfc3984.txt>.

(Continued)

*Primary Examiner*—Christopher Kelley
*Assistant Examiner*—Alazar Tilahun
(74) *Attorney, Agent, or Firm*—Baker Botts L.L.P.

(57) ABSTRACT

The present invention, in particular embodiments, is directed to methods, apparatuses and systems directed to rate adaptive video transmission. In a particular implementation, the present invention provides a video server that delivers video frames received from a video source in response to video frame requests transmitted by one or more video clients. In such a configuration, video clients essentially pull video frames of a video stream at a rate adapted to various attributes of the client and/or the client application consuming the video stream, such as bandwidth available to the client the video client application requirements, and the like. Additional embodiments also provide for novel video data compression techniques that use client pull mechanisms to achieve an adaptive video streaming mechanism. In one implementation, only lower levels of a multi-resolution or wavelet video stream are requested to optimally utilize system bandwidth. In combination with client frame pull, a temporally and spatially scalable multi-resolution image codec, that utilizes wavelet compression, is realized. In yet another implementation, a differencing codec is utilized for compression wherein successive predictive frames are dependent on a reference frame. In combination with client frame pull, the differencing codec is also temporally and spatially scalable. Furthermore, the present invention provides an efficient way to transmit video over wired and wireless networks, particularly mixed networks that contain both wired and wireless networks.

20 Claims, 11 Drawing Sheets

OTHER PUBLICATIONS

RFC 3640: RTP Payload Format for Transport of MPEG-4 Elementary Streams, (J. Van Der Meer), Nov. 2003, [online], [retrieved on May 23, 2007] Retrieved from the Network Working Group using Internet <URL: http://www.rfc-editor.org/rfc/rfc3640.txt>.

RFC 2190: RTP Payload Format for H.263 Video Streams, (C. Zhu), Sep. 1997, [online], [retrieved on May 23, 2007] Retrieved from the Network Working Group using Internet <URL: http://www.rfc-editor.org/rfc/rfc2190.txt>.

Pyramid Methods in Image Processing, (E.H. Adelson), 1984, [online], [retrieved on May 24, 2007] Retrieved from the Scientific Digital Library using Internet <URL: http://citeseer.ist.psu.edu/cache/papers/cs/377/http:zSzzSzwww-bcs.mit.eduzSzpeoplezSzadelsonzSz.zSzpublicationszSzpostscriptzSzRCA84.pdf/adelson84pyramid.pdf>.

Wavelet-based Image Coding, (Geoffrey M. Davis), 1998, [online], [retrieved on May 24, 2007] Retrieved from the Scientific Digital Library using Internet <URL: http://citeseer.ist.psu.edu/cache/papers/cs/1817/http:zSzzSzwww.cs.dartmouth.eduzSz~gdaviszSzpaperszSzaccsc.pdf/davis98waveletbased.pdf>.

Datagram Sockets, Feb. 28, 2007, [online], [retrieved on May 23, 2007] Retrieved from Wikipedia.com using Internet <URL: http://en.wikipedia.org/wiki/Datagram_Sockets>.

User Datagram Protocol, May 22, 2007, [online], [retrieved on May 23, 2007] Retrieved from Wikipedia.com using Internet <URL: http://en.wikipedia.org/wiki/User_Datagram_Protocol>.

Stream Socket, Mar. 18, 2007, [online], [retrieved on May 23, 2007] Retrieved from Wikipedia.com using Internet <URL: http://en.wikipedia.org/wiki/Stream_Sockets>.

Transmission Control Protocol, May 22, 2007, [online], [retrieved on May 23, 2007] Retrieved from Wikipedia.com using Internet <URL: http://en.wikipedia.org/wiki/Transmission_Control_Protocol>.

Multi-scale Image Transforms, 2003, (Jepson), [retrieved on May 24, 2007] Retrieved from University of Toronto using Internet <URL: ftp://ftp.cs.utoronto.ca/pub/jepson/teaching/vision/2503/imageTransforms.pdf>.

Internet Socket, May 22, 2007, [online], [retrieved on May 24, 2007] Retrieved from Wikipedia.com using Internet <URL: http://en.wikipedia.org/wiki/Internet_socket>.

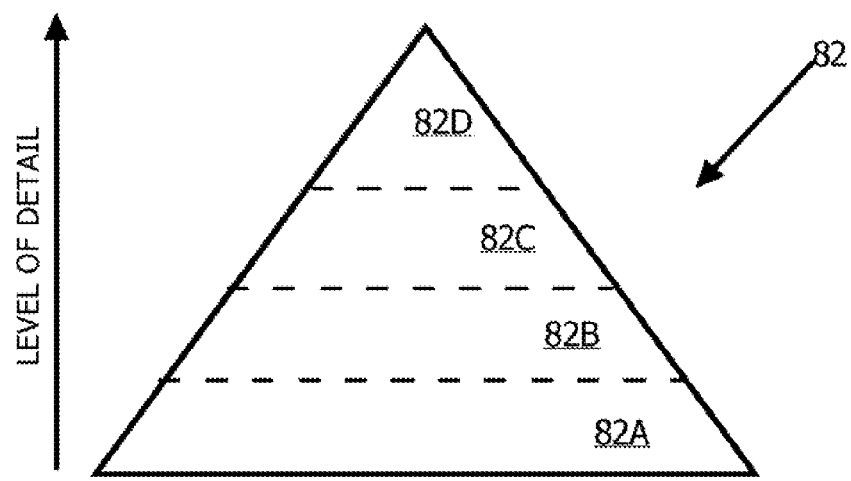
FIGURE 8
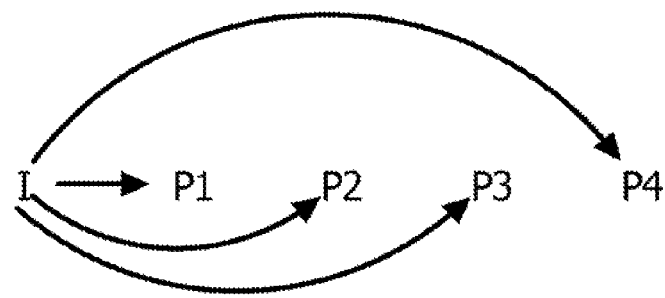
FIGURE 9A   Prior Art
FIGURE 9B

RATE ADAPTIVE VIDEO TRANSMISSION AND SYNCHRONIZATION SYSTEM

TECHNICAL FIELD

The present disclosure generally relates to video transmission systems and, more particularly to video data transmission systems that support video clients with differing data rates.

BACKGROUND

In recent years, video surveillance of public areas, for purposes of enhanced security, has increased considerably. In a typical public venue such as an airport or a shopping mall, feeds from various video sources, such as a security camera, are directed to a central system which in turns streams the video to video client devices. The video client devices and the networks to which they connect can vary considerably. For example, the video clients may range from a client PC connected to the Internet via a fast broadband connection or a Ethernet LAN to a mobile device connected to a relatively bandwidth-constrained wireless carrier network. Among this heterogeneous group of clients, there is typically no single data rate that will satisfy all client demands or requirements. This disparity in data rate requirements can cause overall system performance to suffer as system resources are not intelligently being utilized. For example, transmitting a video stream at one rate has the problem that, in some instances, the video server is transmitting packets at a data rate that a client device or network cannot support. This often leads to packets being dropped and results in wasted bandwidth, which could otherwise have been used to support additional video clients or increase the Quality of Service (QoS) for other video clients.

SUMMARY

The present invention, in particular embodiments, is directed to methods, apparatuses and systems directed to rate adaptive video transmission. In a particular implementation, the present invention provides a video server that delivers video frames received from a video source in response to video frame requests transmitted by one or more video clients. In such a configuration, video clients essentially pull video frames of a video stream at a rate adapted to various attributes of the client and/or the client application consuming the video stream, such as bandwidth available to the client, the video client application requirements, and the like. Additional embodiments also provide for novel video data compression techniques that use client pull mechanisms to achieve an adaptive video streaming mechanism. In one implementation, only lower levels of a multi-resolution or wavelet video stream are requested to optimally utilize system bandwidth. In combination with client frame pull, a temporally and spatially scalable multi-resolution image codec, that utilizes wavelet compression, is realized. In yet another implementation, a differencing codec is utilized for compression wherein successive predictive frames are dependent on a reference frame. In combination with client frame pull, the differencing codec is also temporally and spatially scalable. Furthermore, the present invention provides an efficient way to transmit video over wired and wireless networks, particularly mixed networks that contain both wired and wireless networks.

The following embodiments and aspects thereof are described and illustrated in conjunction with systems, apparatuses and methods which are meant to be exemplary and illustrative, not limiting in scope. In various embodiments, one or more of the above-described problems have been reduced or eliminated. In addition to the aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

FIG. 8 is a diagram illustrating wavelet compression, in accordance with an example embodiment;

FIG. 9A illustrates a prior art real time protocol ("RTP") MPEG4 differencing codec;

FIG. 9B illustrates a modified RTP MPEG4 differencing codec, in accordance with an example embodiment.

DETAILED DESCRIPTION

Figure 1A:
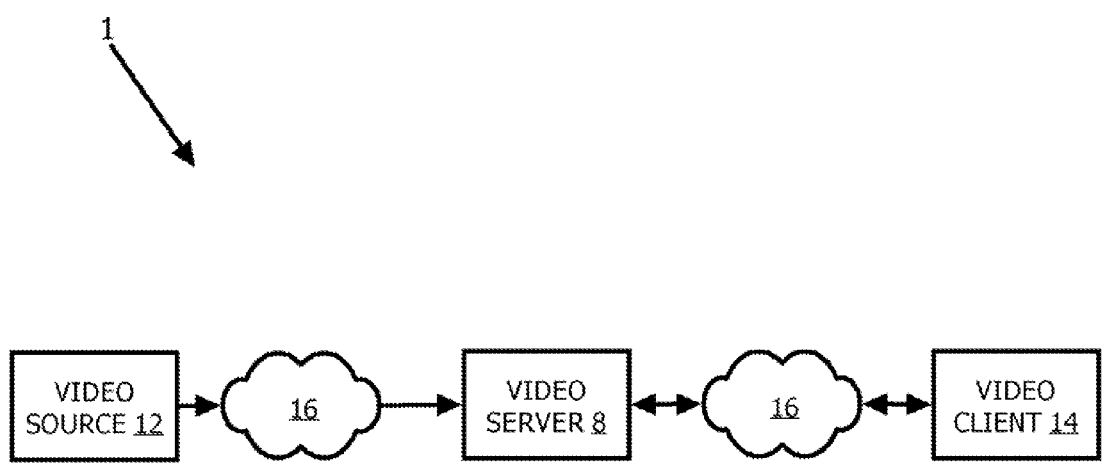
FIG. 1A is a high-level block diagram of a video system, in accordance with an example embodiment.

The following embodiments and aspects thereof are described and illustrated in conjunction with systems, apparatuses and methods which are meant to be illustrative, not limiting in scope.

The present invention, in particular embodiments, is directed to methods, apparatuses and systems directed to rate adaptive video transmission. In a particular implementation, the present invention provides a video server that delivers video frames received from a video source in response to video frame requests transmitted by one or more video clients. In such a configuration, video clients essentially pull video frames of a video stream at a rate adapted to various attributes of the client and/or the client application consuming the video stream, such as bandwidth available to the client, the video client application requirements, and the like.

In a particular implementation, a video server receives a video stream at a first rate, buffering the latest video frame, and delivers the latest buffered video frame in response to a video frame request of a video client. In one implementation, video clients are configured to request a new video frame upon receipt of a current video frame. The operation of the video client and video server together effect a client pull mechanism that serves video at a rate adapted to the client. In this manner, the video server may serve multiple clients at different rates adapted to each client.

Additional embodiments also provide for novel video data compression techniques that use client pull mechanisms to achieve an adaptive video streaming mechanism. This particular implementation is typically implemented via video server 10. In one implementation, only lower levels of a multi-resolution or wavelet video stream are requested to optimally utilize system bandwidth. In combination with client frame pull, a temporally and spatially scalable multi-resolution image codec, that utilizes wavelet compression, is realized. In yet another implementation, a differencing codec is utilized for compression wherein successive predictive frames are dependent on a reference frame. In combination with client frame pull, the differencing codec is also temporally and spatially scalable.

In a particular implementation, the present invention provides a video server that delivers video frames received from a video source in response to video frame requests transmitted by one or more video clients. In such a configuration, video clients essentially pull video frames of a video stream at a rate adapted to various attributes of the client and/or the client application consuming the video stream, such as bandwidth available to the client, the video client application requirements, and the like. Additional embodiments also provide for novel video data compression techniques that use client pull mechanisms to achieve an adaptive video streaming mechanism.

In terms of the claimed embodiments, a "video frame" can be any intra-coded, lossy, compressed image or raw uncompressed image. Standards that encompass this definition, but are not limited to, are JPEG, JPEG 2000, GIF, PNG, wavelet, TIFF, MPEG-1/2/4, I-Frame, H.264 I-Frame, etc.

FIG. 1A is a high-level block diagram of a video system 1, in accordance with an example embodiment. Included is a video server 8, a video source 12, a video client 14 and a network 16. The video server 8 interacts with one or more video sources 12 to deliver frames to one or more video clients 14 over the network 16. When the video client 14 receives the frame, the video client 14 then transmits a request to the video server for a next frame as discussed in more detail below. The video server 8, the video source 12 and the video client 14 will now be discussed in detail. Additionally, an alternative embodiment of video server architecture (video server 10 of FIG. 1C) will also be presented.

Figure 1B:
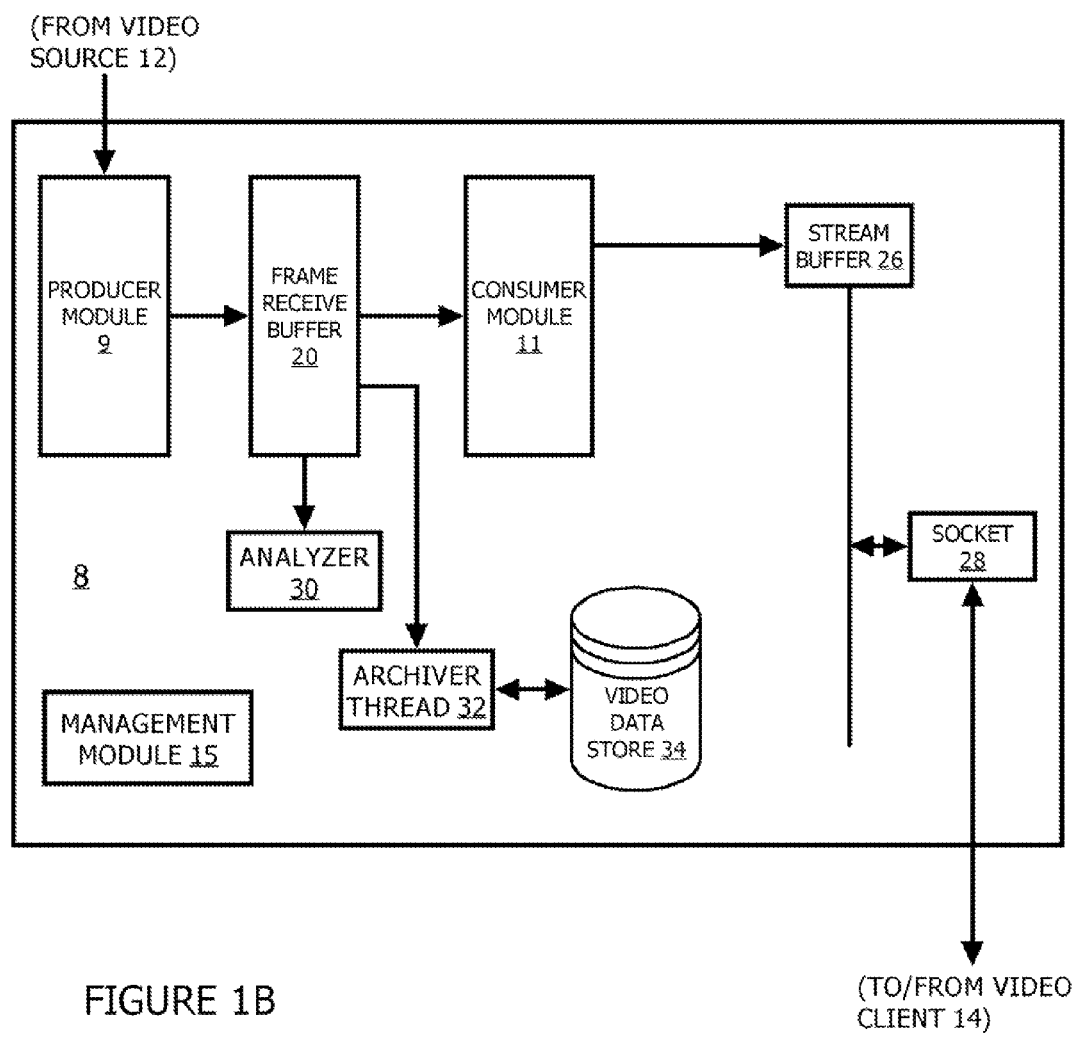
FIG. 1B is a block diagram of one implementation of a video server, in accordance with an example embodiment.

FIG. 1B is a block diagram illustrating various functional modules and logical components of the video server 8, in accordance with an example embodiment. The video server 8 can be implemented in the server architecture 200 of FIG. 10. The video server 8 interacts with one or more video sources 12 to deliver frames to one or more video clients 14 over the network 16. When the video client 14 receives the frame, the video client 14 then transmits a request to the video server for a next frame as discussed in more detail below.

Video source 12 is a source of video data. In one implementation, video source 12 comprises a video camera and associated control logic to provide video data to video server 10. Video source 12 can employ video push, pull or streaming technologies.

Initially, the video source 12, which is a source of video data, establishes a connection with the video server 8 over the network 16. The video source 12 may comprise an IP-based camera which is operative to maintain a connection with the video server 8. For example, if a connection between the video source 12 and the video server 8 is interrupted or terminated, the video source 12 will attempt to re-establish the connection. The video source 12 can also be wired or wireless. Additionally, video source 12 can employ video push, pull or streaming technologies.

In response to a connection with a video source, a management module 15 may start up a producer module 9, reserve space in a memory 214 (refer to FIG. 10) for a frame receive buffer 20 and further start a consumer module 11. Producer module 9 can obtain video frames from the video source 12 via a number of methods such as a grabber thread, which will be described in subsequent section in reference to video server 10, or FTP upload. When a video client 14 requests a video feed from the video source 12, the consumer module 11 establishes a socket connection 28 with the video server 8. Additionally, the management module 15 also reserves space in memory 214 for a stream buffer 26. The frame receive buffer 20 and the stream buffer 26 typically retain a latest-received frame. In one implementation, a previously-received frame is overwritten, when a new frame is received.

In terms of the claimed embodiments, the socket connection 28 can be implemented via numerous protocols such as, but not limited to, a TCP/IP socket, a socket using synchronous blocking input/output ("IO"), a socket using asynchronous non-blocking IO, an HTTP tunnel using a TCP/IP socket and an HTTP tunnel using a TCP/IP socket transmitting RTP packets in an RTSP interleave format.

Additionally, the socket connection 28 can be utilized using UDP packets. For example, a frame may be segmented into a set of UDP packets sent to the video client 14 at an IP address and related port, and frame may be read thread-wise via an in-bound UDP packet from the video client 14 which may be the acknowledgement of the last frame received and may also be a request for the next frame. A variation of using the preceding UDP packet embodiment is to further utilize RTP headers and payload specifications in conjunction with RTCP control packets. Yet another variation is to use UDP packets in combination with non-blocking asynchronous IO such as a selector or an IO completion port.

When a video frame arrives from the video source 12, the producer module 9 requests a synchronization lock for access to the frame receive buffer 20. Once the lock has been obtained, the producer module 9 writes the video frame to the frame receive buffer 20 and releases the synchronization lock. The synchronization lock on the buffer is utilized to prevent the producer module 9 and the consumer module 11 from simultaneously attempting to access the frame receive buffer 20. The producer module 9 can obtain video frames from the video source 12 via a number of methods such as server push which involves a multi-part mime HTTP protocol, client pull, ftp upload or a RTP MPEG4 stream.

When the consumer module 11 receives a frame request from the video client 14 and a new frame is available in the frame receive buffer 20, the consumer module 11 requests the synchronization lock for access to the frame receive buffer 20, reads the new frame and releases the lock. Next, the consumer module 11 stores the new frame in the stream buffer 26 before it is written to the socket 28 for delivery to the video client 14.

If the video client 14 makes a subsequent request for a new frame but the frame in the stream buffer was previously delivered to the video client 14, the consumer module 11 does not resend the current frame to the video client 14. The consumer module 11 does this, in one implementation, by setting a frame ID value to that of a received frame ID. When a next frame request is received from the video client 14, the consumer module 11 compares the frame ID value with a frame ID of the frame currently in the stream buffer 26. If a match occurs, the consumer module 11 determines that the previously-sent frame is still in the stream buffer 26.

Figure 1C:
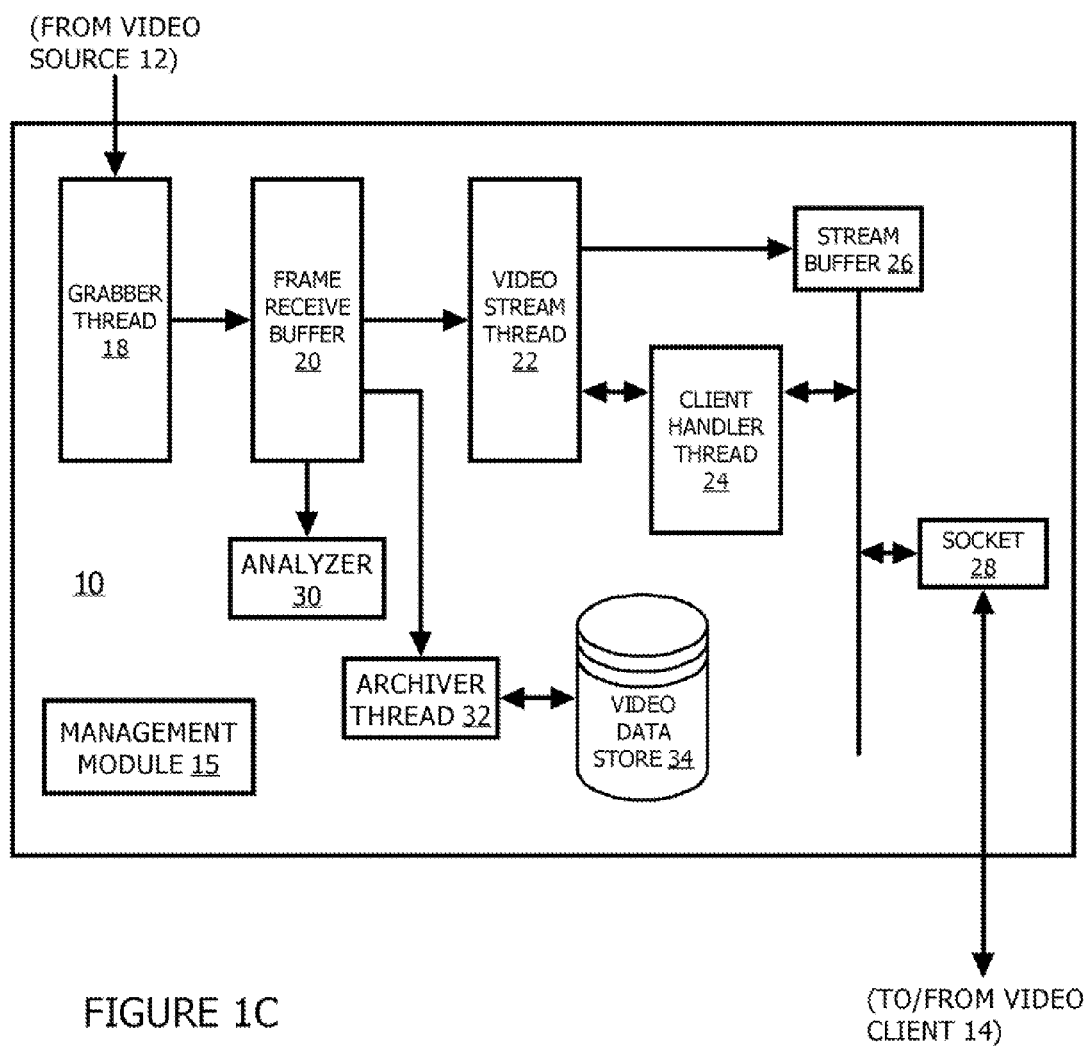
FIG. 1C is a block diagram of another implementation of a video server, in accordance with an example embodiment.

While only one consumer module 11 and one socket 28 are depicted in FIG. 1C, video server 8, in practice, will typically maintain multiple consumer modules and multiple sockets. Consumer modules are clients of the producer module 9.

If no new frame is available for a threshold amount of time, the management module 15 places the consumer module 11 into a wait or sleep state wherein its activity is halted until the consumer module 11 is notified or "woken up" when a new frame becomes available. In one implementation, the producer module 9 performs this function as part of the process of writing the new frame to the frame receive buffer 20. By doing this, system resources are advantageously not wasted, and are available to other modules, during extended periods when a new frame is not available. In another implementation, the management module 15 closes inactive consumer modules, and associated socket connections to video clients, every N seconds.

System resources are also maintained in that the video client 14 determines its preferred frame rate via a time duration between frame requests. This advantageously prevents a situation where the video server 8 may send out frames at a rate which is too fast for the video client 14.

The video server 8 may also include an analyzer 30, in one implementation. The analyzer 30 is used for video analysis for such things as license plate identification and facial recognition, for example. The analyzer 30 may also be implemented as an analyzer thread, in one implementation. Additionally, in another implementation, the analyzer 30 may be separate from the video server 8 and connected to the video source instead of being connected to the frame receive buffer 20 as depicted in FIG. 1B. If the analyzer 30 is connected to the video source, the analyzer 30 will typically perform low level analysis such as object detection and higher level analysis such as object identification will be performed by the video server 8.

In another implementation, the video server 8 can also include an archiver thread 32 which pulls frames from the frame receive buffer 20 and writes the pulled frames to a video data store 34. Archiving typically requires a lower frame rate than the rate of the video source 12. Due to that, the archiver thread 32 typically will not pull every frame that the frame receive buffer receives. The archiver thread 32 will also typically maintain a queue of incoming frames due to potential fluctuations of read/write cycles to the video data store 34. In one implementation, the video data store 34 is located remotely from the video server 8.

As previously mentioned, the claimed embodiments provide for an alternative embodiment of video server architecture. Specifically, FIG. 1C is a block diagram of another implementation of a video server 10, in accordance with an example embodiment. Video servers 8 and 10 have various common aspects. Due to that, the description of video server 10 will concentrate on aspects that are not present in the description of video server 8. That being said, it should not be assumed that video server 8 also does not include or could be implemented to include one or more of the to be described video server 10 aspects. Furthermore, one skilled in the art will also recognize that one or more of the common aspects may not be present in some specific implementations of the video servers 8 and 10.

Similar, in various aspects of video server 8, in response to a connection with a video source, management module 15 may invoke a grabber thread 18 and reserves space in a memory 214 (refer to FIG. 10) for a frame receive buffer 20. When a video client 14 requests a video feed from the video source 12, a socket connection 28 is established with the video server 10 and the management module 15 invokes a video stream thread 22 and a client handler thread 24. Additionally, the management module 15 also reserves space in memory 214 for a stream buffer 26.

Grabber thread 18 can obtain video frames from the video source 12 via a number of methods such as server push which involves a multi-part mime HTTP protocol, client pull, ftp upload or a RTP MPEG4 stream. In one implementation, the grabber thread 18 utilizes client pull to grab a frame, from the video source 12. After the frame has been received, the grabber thread 18 stores the received frame in the frame receive buffer 20. One or more listening threads (e.g., video stream thread 22 archiver thread 32, etc.) may consume the frames stored in the frame receive buffer at different rates.

The video stream thread 22 reads frames from the frame receive buffer 20 as they are received (or at some defined rate) and stores them in a stream buffer 26. When a request for a new frame from a video client 16 is received on a socket 28, the client handler thread 24 writes the new frame from the stream buffer 26 to the socket 28 for delivery to the video client 16. If the video client 14 makes a subsequent request for a new frame but the frame in the stream buffer was previously delivered to the video client 14, the client handler thread 24 does not resend the current frame to the video client 14. The client handler thread 24 does this, in one implementation, by setting a frame ID value to that of a received frame ID. When a next frame request is received from the video client 14, the client handler thread 24 compares the frame ID value with a frame ID of the frame currently in the stream buffer 26. If a match occurs, the client handler thread 24 determines that the previously-sent frame is still in the stream buffer 26.

Similar to video server 8, the frame receive buffer 20 also utilizes a synchronization lock to prevent the grabber thread 18 and the video stream thread 22 from simultaneously trying to access the frame receive buffer 20.

While only one video stream thread 22, one client handler thread 24 and one socket 28 are depicted in FIG. 1C, video server 10, in practice, will typically maintain multiple threads (22, 22, 24) and multiple sockets. Video stream threads are clients of the grabber 18. Client handler threads, in turn are clients of the video stream threads, each video stream thread potentially having multiple client handler threads. Similarly, each client handler thread can maintain multiple sockets, each socket corresponding to a video client.

If no new frame is available for a threshold amount of time, the management module 15 places the video stream thread 22 and the client handler thread 24 into a wait or sleep state wherein their activity is halted until they are "woken up" by the management module 15 once a new frame is received at the frame receive buffer 20. By doing this, system resources are advantageously not wasted, and are available to other threads, during extended periods when a new frame is not available. In another implementation, the management module 15 closes inactive video stream threads every N seconds.

Figure 2:
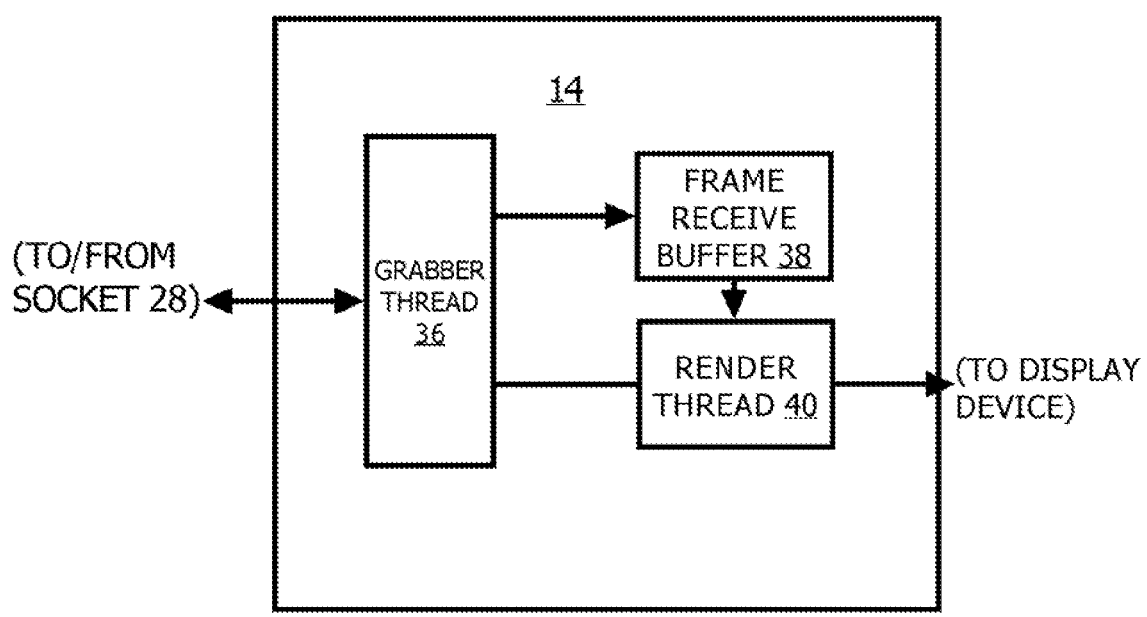
FIG. 2 is a block diagram of a video client, in accordance with an example embodiment.

Referring to FIG. 2, FIG. 2 is a block diagram of a video client 14 which includes a client grabber thread 36 that receives a frame from a socket connection to the video server (8 or 10) and stores the received frame in the frame receive buffer. The video client 14 also includes a render thread 40 that decodes and renders the frame, in the frame receive buffer 38, onto a display. Typically, the grabber thread 36 is pulling a next frame while the render thread 40 is rendering the frame in the frame receive buffer 38. If a frame is not received for a threshold amount of time, a processor of the video client 14 severs the connection with the video server (8 or 10), waits N seconds and establishes a new connection.

FIGS. 3-7 are various flowchart diagrams that further illustrate operations of the video server (8 and 10, as stated below) and the video client 14.

Figure 3:
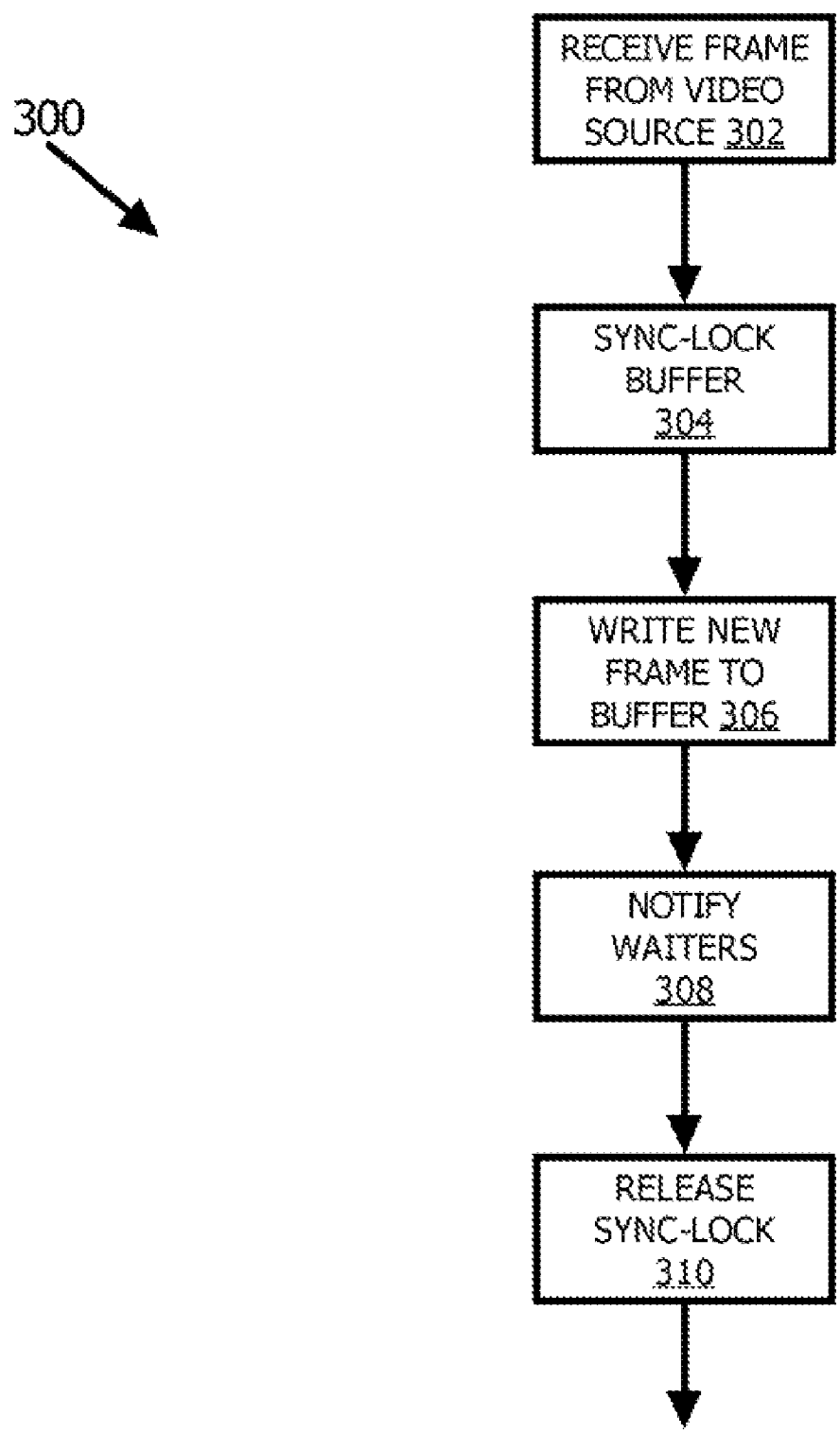
FIG. 3 is a flowchart diagram illustrating a method for locking and unlocking a frame receive buffer; in accordance with an example embodiment.

Beginning with FIG. 3, FIG. 3 is a flowchart diagram illustrating a method 300 for locking and unlocking the frame receive buffer 20, in accordance with an example embodiment. Method 300 may be utilized by video servers 8 and 10. First, the producer module 9, or grabber thread 18, receives (302) a frame from a video source 12 and requests (304) a synchronization lock on the frame receive buffer 20. Once the lock is obtained, the producer module 9, or grabber thread 18, writes (306) the frame to the buffer and the management module 15, in turn, notifies (308) any waiters that are in a wait state. The producer module 9, or grabber thread 18, then releases (310) the synchronization lock.

Figure 4:
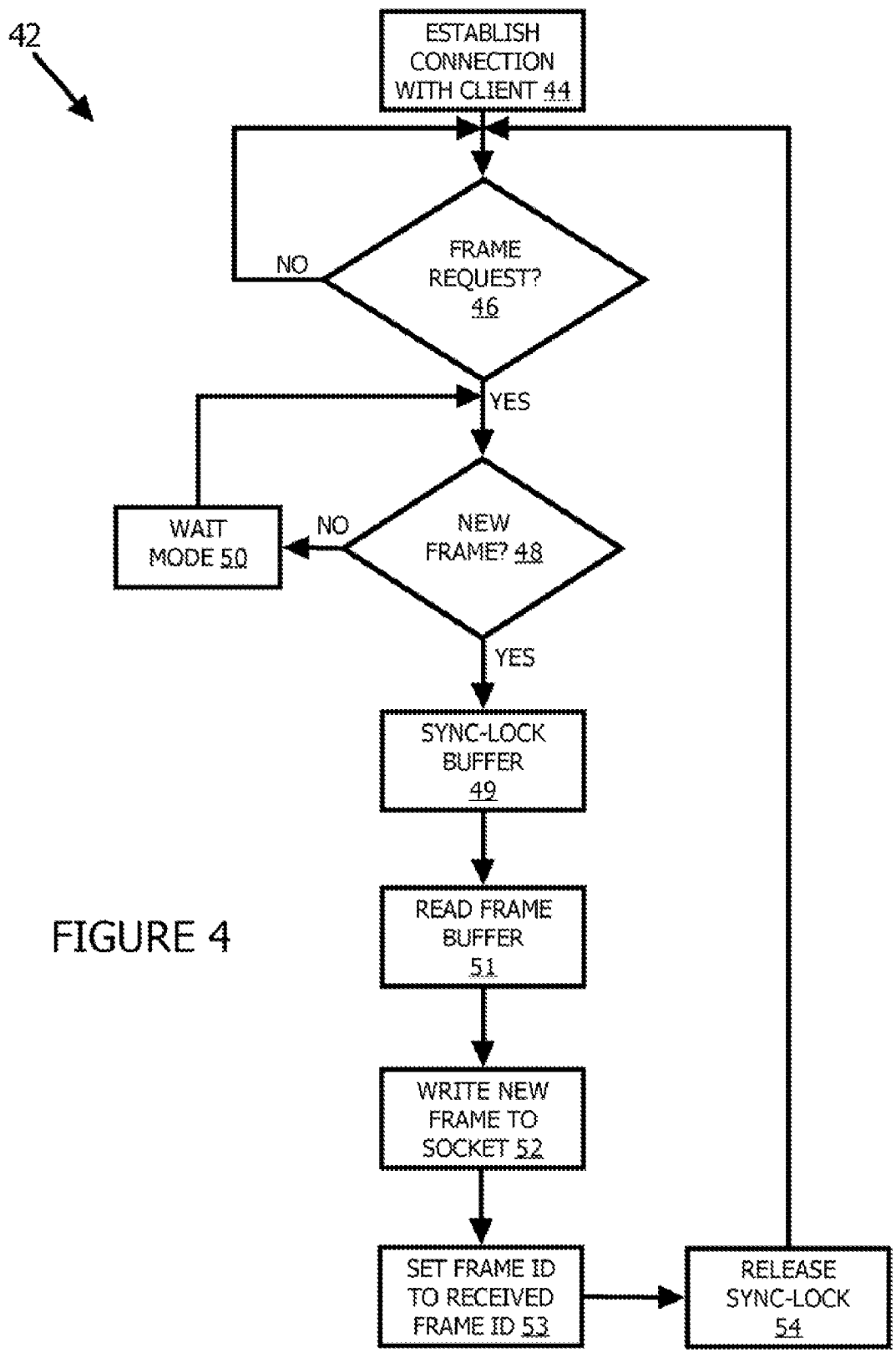
FIG. 4 is a flowchart diagram illustrating a method for sending video frames from a video server to a video client, in accordance with an example embodiment.

FIG. 4 is a flowchart diagram illustrating a method 42 for sending video frames from a video server (8, 10) to a video client 14, in accordance with an example embodiment. Specifically, method 42 illustrates how the client handler thread 24, or consumer module 11, processes video client frame requests. The client handler thread 24, or consumer module 11, establishes (44) a socket connection with the video client 14 and waits (46) for a frame request from the video client 14. In one implementation, the frame request has a one byte payload comprising a sequence number. Once the frame request has been received, the client handler thread 24, or consumer module 11, determines if a new frame is available (48). The client handler thread 24, or consumer module 11, accomplishes this by setting a frame ID value to that of a received frame ID. When a next frame request is received from the video client 14, the client handler thread 24, or consumer module 11, compares the frame ID value with a frame ID of the frame currently in the stream buffer 26. If a match occurs, the client handler thread 24, or consumer module 11, determines that the previously-sent frame is still in the stream buffer 26.

If there is a match, no new frame is available (48) and the client handler thread 24, or consumer module 11, goes into a wait mode 50 and rechecks (48) for a new frame. When a new frame becomes available (48), the client handler thread 24, or consumer module 11, requests (49) a synchronization lock from the frame receive buffer 29, reads (50), once the lock is obtained, the new frame and writes (52) the new frame to the socket 28. In one implementation, a header of the new frame is four bytes longs and is indicative of a size of the payload. Structuring the header in this manner allows the video client 14 to efficiently read the new frame. After the frame has been written to the socket (52), the client handler thread 24, or consumer module 11, sets its frame ID value to that of the written frame (53). The client handler thread 24, or consumer module 11, releases (54) the lock and waits for a next frame request (46).

Figure 5:
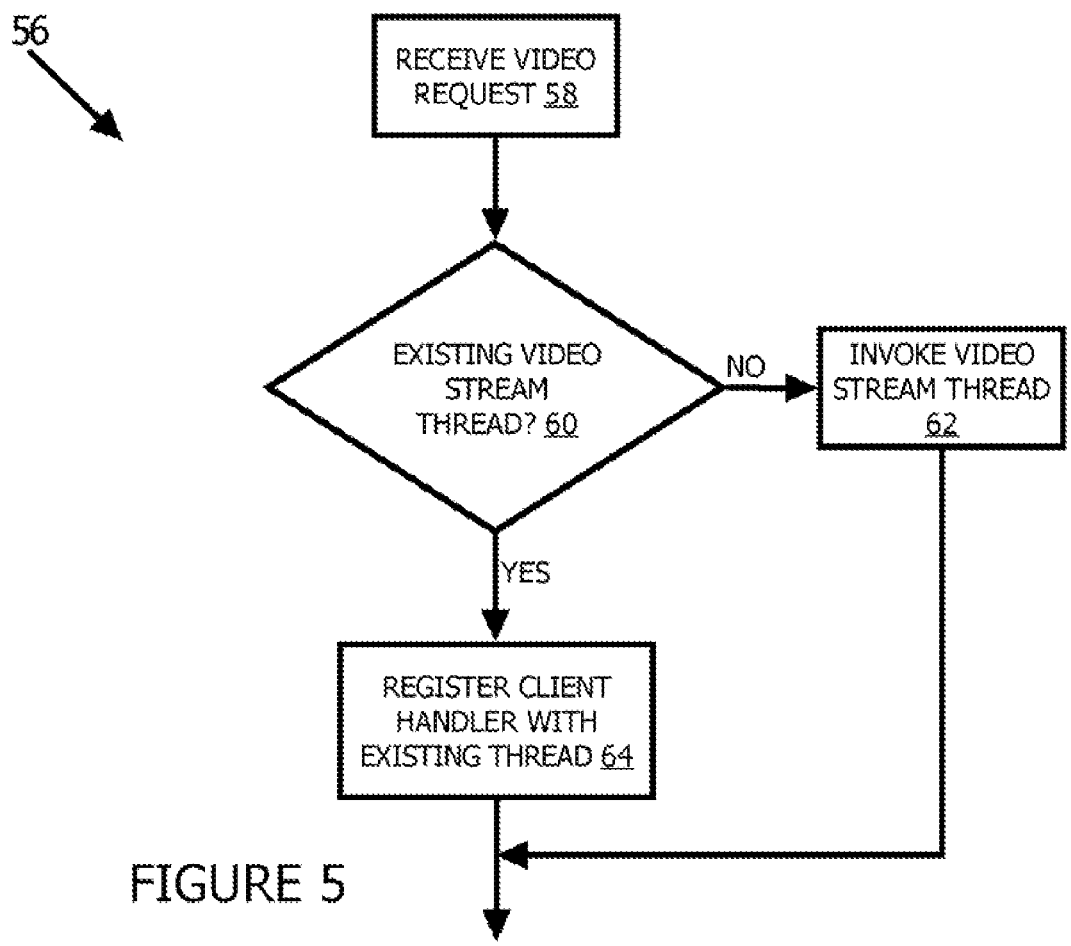
FIG. 5 is a flowchart diagram illustrating a method of a video server processing a video request from a video client, in accordance with an example embodiment.

FIG. 5 is a flowchart diagram illustrating a method 56 of the video server 10 processing a video request from the video client 14, in accordance with an example embodiment. The video server 10 initially receives a video request (58) from the video client 14. In one implementation, the video request is hashed tuple of parameters including one or more of camera ID, height and width of frame, or frame rate). The video server 10 then determines if any existing video stream threads (60) can accommodate the video request. If no, the video server 10, via management module 15, invokes a new video stream thread (62) to handle the video request. If there is an existing video stream thread (60), the video server 10 registers a client handler thread, to handle the video request, with the existing video stream thread (64).

Figure 6:
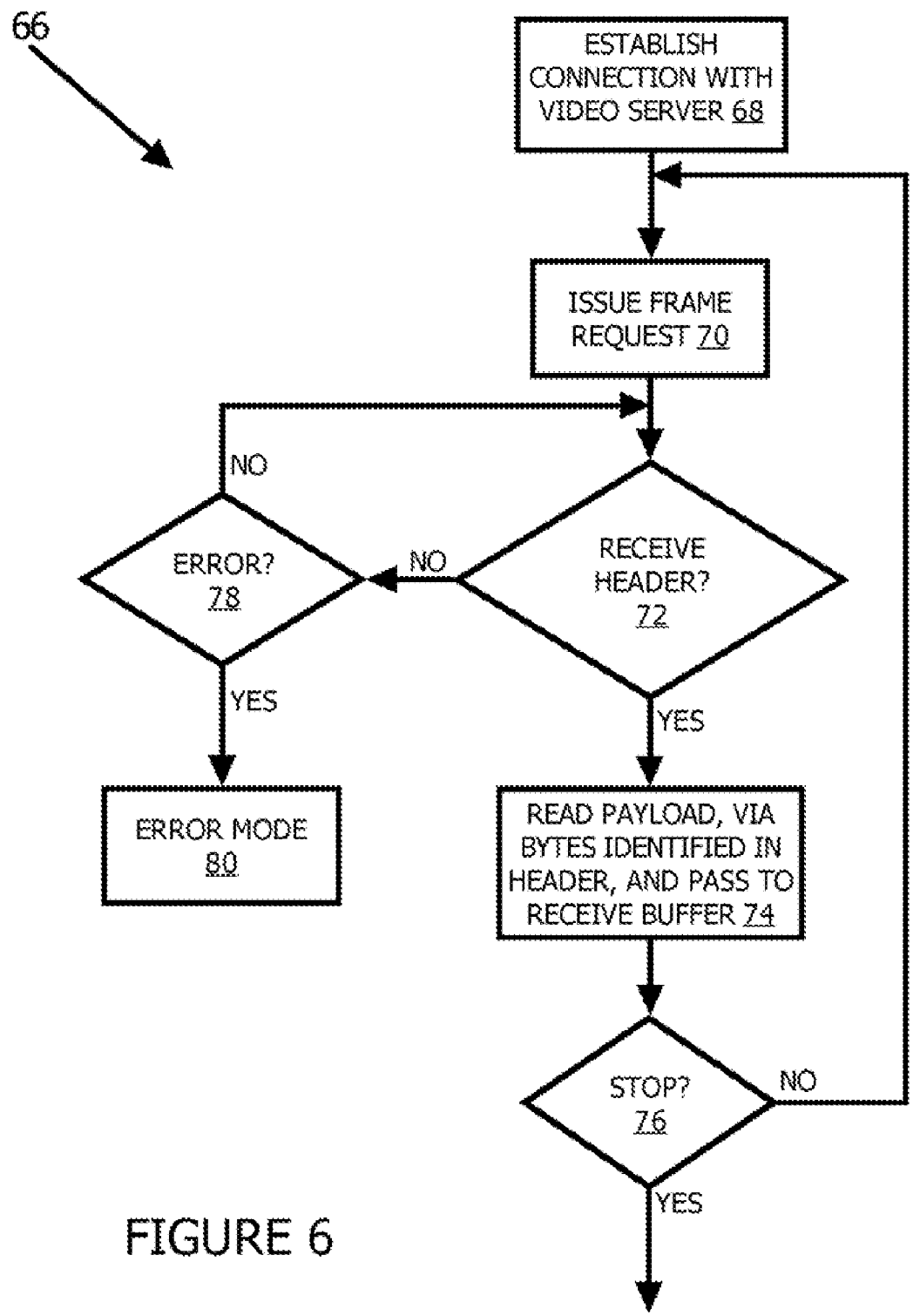
FIG. 6 is a flowchart diagram illustrating a method for processing frame data at a video client, in accordance with an example embodiment.
Figure 7:
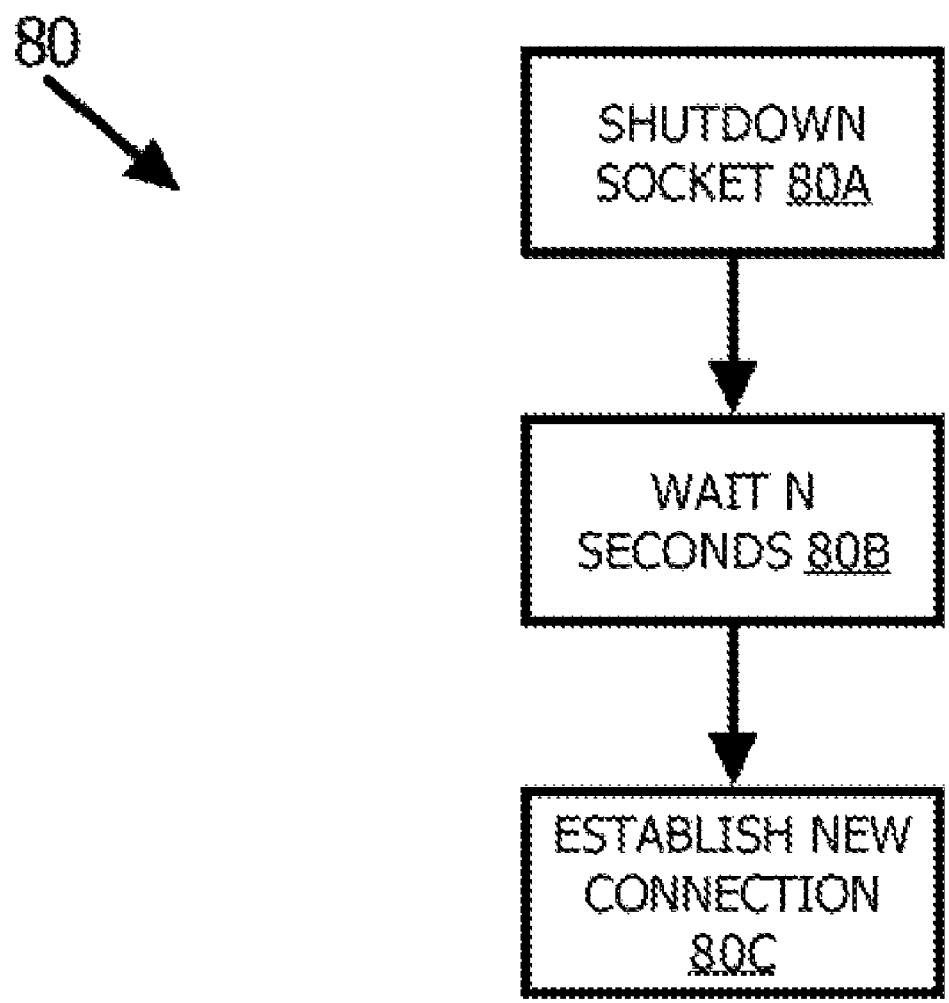
FIG. 7 is a flowchart diagram illustrating timeout error processing at a video client, in accordance with an example embodiment.

FIG. 6 is a flowchart diagram illustrating a method 66 for processing frame data at the video client 14, in accordance with an example embodiment. Method 66 involves the video client 66 requesting a frame from the video server 10, receiving the frame and error handling in case the frame is not received. The video client 14 first establishes a connection (68) with the video server 10 and issues a frame request (70) to the video server 10. In one implementation, the frame request includes a one-byte payload comprising a sequence number that is incremented with each successive frame request. A response from a video server 10 includes a packet including a header and a payload. The payload comprises a frame header and frame data. If the video client 14 receives a frame header (72) on a socket connection to the video server 10, the video client reads the payload, via bytes identified in the header, and passes the payload to the frame receive buffer 38 (74). If there are no more frame requests, the video client 14 stops (76) requesting frames. Otherwise, the video client 14 issues another frame request (70).

One situation that may result in another frame request not being issued is if an operator of the video client (14) has stopped viewing the associated video device. Another possible scenario is that the feed on the operator's screen has been minimized. In one implementation, a socket connection to the video server 10 is maintained for a short amount of time after operation 76.

If the video client 14 does not receive a header (72), the video client determines if an error has occurred (78). An example of an error is a timeout while waiting for the header. If an error has occurred (78), the video client 14 enters error mode (80) which will be described in reference to FIG. 7. When the video client enters error mode (80), the video client 14 first shutdowns the socket connection with the video server 10 (80A), waits N seconds (80B) and establishes a new socket connection with the video server 10 (80Q). The video client 14 can have multiple, simultaneous socket connections to the video server 10, each receiving frames from a different video source 12. Each socket connection will typically be receiving frames at a nominal frame rate which is ideal for a thumbnail view on a screen of the video client 14. When a particular thumbnail is selected by a user of the video source 12, the video client 14 will establish a new socket connection with the video server 10 in order to receive frames from the selected video source at a higher frame rate and larger frame size, in one implementation.

Other implementations of system 1 of FIG. 1A can operate in connection with various video compression formats to achieve spatially and temporally-scalable systems. One such example is multi-resolution image codec that utilizes wavelet compression and a representation of wavelet compression is shown in FIG. 8 via triangle 82. Triangle 82 is separated into various levels (82A, 82B, 82C, 82D) which represent successive increases in frame resolution with each passing upper level. When wavelet compression is utilized, it is possible to just request the lower levels (for example, levels 82A and 82B) of a frame. Doing so achieves a reduction in the amount of data to transfer. The video client 14 can request a lower resolution frame by specifying the desired resolution level with a frame request. Requesting different resolution levels can also be done within an existing video stream thread. When used in combination with client pull, which is temporally scalable as every frame is not required, the resulting multi-resolution image codec is both spatially and temporally scalable.

In terms of the claimed embodiments, the term "wavelet" and the phrase "progressive JPEG" can both generally be referred to by the phrase "multi-resolution frame."

In one implementation, frames may be transcoded between the frame receive buffer 20 and the stream buffer 26. Such transcoding operations may be performed to transform the frames to thumbnail versions of the frames, adapt the video stream to a different video format or codec, and the like. In one implementation, management module 15 invokes video stream threads as required for client requests identifying various requirements for a video stream, such as frame rates, formats, etc. The invoked video stream thread 22 is configured to transcode frames stored on receive buffer as required for one or more video clients 14.

Another implementation can involve a modified RTP MPEG4 codec. To fully illustrate, a prior art RTP MPEG4 differencing codec will first be described via FIG. 9A. RTP MPEG4 utilizes successive groupings of a reference frame (I) for by for predictive frames (P1, P2, P3, P4). Each successive predictive frame (P1, P2, P3, P4) contains difference data that describes how that current frame has changed in comparison to the previous frame. Due to this, all frames are required to accurately reconstruct frames. And since all frames are required, the RTP MPEG4 differencing codec is not temporally scalable.

FIG. 9B illustrates a modified RTP MPEG4 differencing codec, in accordance with an example embodiment. Instead of basing difference data on successive predictive frames (P1, P2, P3, P4), each predictive frame is differenced directly from the reference frame (I). By doing this, a temporally scalable RTP MPEG4 differencing codec is achieved as some of the predictive frames (P1, P2, P3, P4) can be dropped, if desired. To implement this modified RTP MPEG4 differencing codec with the claimed embodiments, the video client 14 specifies the reference frame (I) ID in frame requests as the requested frame will likely be dependent on that identified reference frame (I). Periodically, a new reference frame (I) will be delivered to the video client 14. Also, frame receive buffer 20 and the stream buffer 26 will typically be expanded in order to hold the latest reference frame (I) and the latest predictive frame (P).

Figure 10:
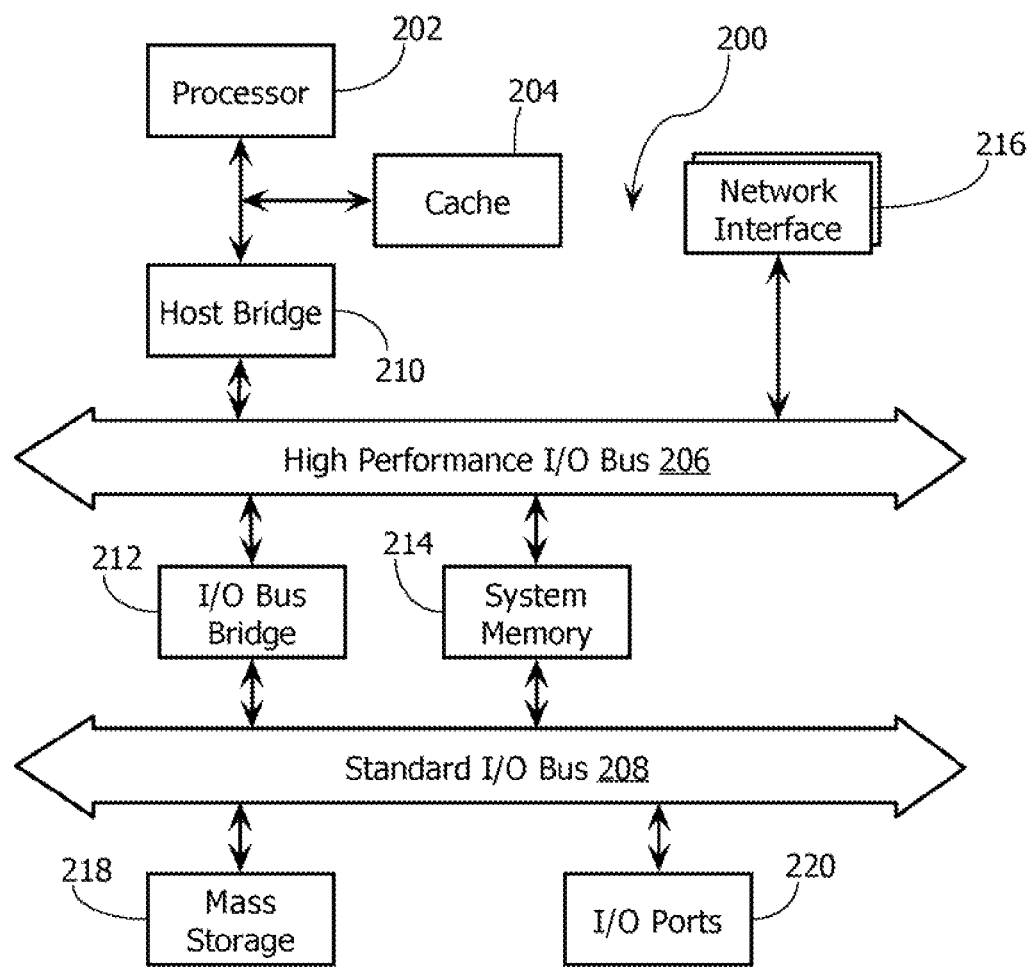
FIG. 10 is a schematic diagram illustrating an example computing system architecture that may be used to implement one or more of client systems.

While the methods of the claimed embodiments have been described above with reference to specific embodiments, some or all of the elements or operations thereof may be implemented using a computer system having a general purpose hardware architecture such as the one in FIG. 10 which illustrates an example hardware system 200, which may be used to implement a video server 10 or a video client 14 with the addition of some extra components such as a display device, system memory, a keyboard device and a pointing device as mentioned below. In one implementation, hardware system 200 comprises a processor 202, a cache memory 204, and one or more software applications and drivers directed to the functions described herein. In one implementation, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218 and I/O ports 220 couple to bus 208. A variety of memory management and caching schemes can be used. Hardware system 200 may optionally include a keyboard and pointing device (not shown) coupled to bus 208. Collectively, these elements are intended to represent a broad category of computer hardware systems, including but not limited to general purpose computer systems based on the Pentium® processor manufactured by Intel Corporation of Santa Clara, Calif., as well as any other suitable processor.

Network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the system controller, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain implementations of the present invention may not require nor include all of the above components. For example, the peripheral devices shown coupled to standard I/O bus 208 may couple to high performance I/O bus 206. In addition, in some implementations only a single bus may exist, with the components of hardware system 200 being coupled to the single bus. Furthermore, hardware system 200 may include additional components, such as additional processors, storage devices, or memories.

The operations of the claimed embodiments may be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the Windows® 95/98/NT/XP/Vista operating system, available from Microsoft Corporation of Redmond, Wash. However, the present invention may be used with other suitable operating systems, such as the Apple Macintosh Operating System, available from Apple Computer Inc. of Cupertino, Calif., UNIX operating systems, LINUX operating systems, and the like.

While a number of exemplary aspects and embodiments have been discussed above, those of skill in the art will recognize certain modifications, permutations, additions and sub-combinations thereof. Accordingly, it is therefore intended that the following appended claims and claims hereafter introduced are interpreted to include all such modifica-

What is claimed is:

1. A video server comprising: a processor; a frame receive buffer;
   a producer module operative to:
      receive a video frame from a video source;
      request a synchronization lock to the frame receive buffer;
      when the synchronization lock is received:
         write the frame to the frame receive buffer;
         notify one or more consumer modules in a wait state; and
         release the synchronization lock;
   a consumer module operative to:
      maintain a socket connection with a video client;
      request the synchronization lock to the frame receive buffer;
      enter the wait state when a new video frame is not available;
      exit from the wait state when notified by the producer module;
      when the synchronization lock is received:
         read the video frame from the frame receive buffer; and
         write the video frame to the socket connection.

2. The video server as recited in claim 1 further wherein the consumer module is further operative to close the socket connection if a frame request is not received from the video client.

3. The video server as recited in claim 1 wherein the video frame is a multi-resolution frame and wherein the consumer module is operative to deliver a variable number of levels of the multi-resolution frame.

4. The video server as recited in claim 1 wherein the consumer module utilizes a differencing codec for the video frame and wherein the consumer module is further operative to select a reference frame or a predictive frame to be sent to the video client based on a previously sent video frame type.

5. The video server as recited in claim 1 further comprising a management module operable to invoke an archiver thread that pulls video frames from the frame receive buffer and archives the pulled video frames in a video data store.

6. The video server as recited in claim 1 further comprising a management module operable to invoke an analyzer thread that pulls video frames from the frame receive buffer and analyzes the pulled video frames.

7. A video server comprising:
   one or more processors;
   one or more network interfaces;
   a memory
   a management module, physically stored in the memory, operable to:
      invoke a grabber thread operative to
         receive video frames from a video source;
         store the pulled frames in a frame receive buffer;
      invoke a video stream thread operative to
         read the video frames from the frame receive buffer; and
         store the pulled video frames into a stream buffer;
      invoke a client handler thread operative to
         maintain a socket connection with a video client,
         read frames from the stream buffer; and
         write the frames to the socket connection in response to frame requests from the video client.

8. The video server as recited in claim 7 wherein the management module is further operative to selectively place the grabber thread, the video stream thread and the client handler thread in a wait state if a new video frame is not available.

9. The video server as recited in claim 7 wherein the video stream thread and the client handler thread are invoked when the video client initially requests a video frame.

10. The video server as recited in claim 7 wherein the client handier thread is further operable to close the socket connection if frame requests are not received for a threshold time period.

11. The video server as recited in claim 7 wherein the management module is further operable to close the grabber thread, the video stream thread and the client handler thread if frame requests are not received for a threshold time period.

12. The video server as recited in claim 7 wherein the frames are multi-resolution frames and wherein the client handler thread is operative to deliver a variable number of levels of the multi-resolution frames.

13. The video server as recited in claim 7 wherein the management module utilizes a differencing codec for the frames and wherein the client handler thread is further operative to select a reference frame or a predictive frame to be sent to the video client based on a previously sent frame type.

14. The video server as recited in claim 7 wherein the management module is further operable to invoke an archiver thread that pulls frames from the frame receive buffer and archives the pulled frames in a video data store.

15. The video server as recited in claim 7 wherein the management module is further operable to invoke an analyzer thread that pulls frames from the frame receive buffer and analyzes the pulled frames.

16. A video server comprising:
   one or more processors;
   one or more network interfaces;
   a memory
   a management module, physically stored in the memory, operable to:
      invoke a grabber thread operative to
         receive video frames from a video source;
         store the pulled frames in a frame receive buffer;
      invoke a video stream thread operative to
         read frames from the frame receive buffer; and
         store the pulled frames into a stream buffer;
      invoke a client handler thread operative to
         maintain a socket connection with a video client,
         read frames from the stream buffer;
         write the frames to the socket connection in response to frame requests from the video client;
      selectively place the grabber thread, the video stream thread and the client handler thread in a wait state if a new video frame is not available; and
      close the grabber thread, the video stream thread and the client handler thread if frame requests are not received for a threshold time period;
   wherein the video stream thread and the client handler thread are initiated when the video client initially requests a video frame.

17. The video server as recited in claim 16 wherein the frames are multi-resolution frames and wherein the client handler thread is operative to deliver a variable number of levels of the multi-resolution frames.

18. The video server as recited in claim 16 wherein the management module utilizes a differencing codec for the frames and wherein the client handler thread is further operative to select a reference frame or a predictive frame to be sent to the video client based on a previously sent frame type.

19. The video server as recited in claim 16 wherein the management module is further operable to invoke an archiver thread that pulls frames from the frame receive buffer and archives the pulled frames in a video data store.

20. The video server as recited in claim 16 wherein the management module is further operable to invoke an analyzer thread that pulls frames from the frame receive buffer and analyzes the pulled frames.

* * * * *